United States Patent [19]

Kachikian

[11] Patent Number: 4,849,836
[45] Date of Patent: Jul. 18, 1989

[54] COPY PROTECTION FOR COMPUTER DISCS

[75] Inventor: Kevin R. Kachikian, Fountain Valley, Calif.

[73] Assignee: Software Heaven, Inc., San Diego, Calif.

[21] Appl. No.: 889,796

[22] Filed: Jul. 24, 1986

Related U.S. Application Data

[63] Continuation-in-part of Ser. No. 742,714, Jun. 7, 1985, abandoned.

[51] Int. Cl.$^4$ .................... G11B 5/02; G11B 15/04; G11B 5/09
[52] U.S. Cl. ........................... 360/60; 360/133; 364/300
[58] Field of Search ............ 360/60, 133, 135; 364/300, 900, 200

[56] References Cited

U.S. PATENT DOCUMENTS

| | | | |
|---|---|---|---|
| 4,100,575 | 7/1978 | Morio et al. | 358/120 |
| 4,462,078 | 6/1984 | Ross | 364/300 |
| 4,577,289 | 3/1986 | Comerford et al. | 360/60 X |
| 4,584,641 | 4/1986 | Guglielmino | 360/60 X |
| 4,734,796 | 3/1988 | Grynberg | 360/60 |

FOREIGN PATENT DOCUMENTS

| | | | |
|---|---|---|---|
| 0129427 | 12/1984 | European Pat. Off. | 360/60 |
| 0172439 | 2/1986 | European Pat. Off. | |
| 53-89715 | 7/1978 | Japan . | |
| 2131580 | 6/1984 | United Kingdom . | |

Primary Examiner—Stuart N. Hecker
Assistant Examiner—Alyssa H. Bowler
Attorney, Agent, or Firm—Weissenberger & Peterson

[57] ABSTRACT

A copy protection system for computer discs in which a key sequence of 1101 in a copy protection section of the program is deliberately rendered ambiguous by repeatedly recording a word containing that sequence while gradually shifting the phase of the transition forming the central "1" of the sequence until the sequence becomes 1011. When this series of words is repetitively read, successive reads will be inconsistent with one another. The gradual phase shift cannot be reproduced if the disc is copied on a standard personal computer, so that the inconsistency on successive readouts will not be present in a copied disc. The program is so designed that it cannot run unless inconsistencies are detected in the copy protection section of the program. The provision of "1"s on each side of the central, variable two-bit sequence prevents spurious loss of synchronization on the copied disc which could be interpreted as an inconsistency.

Alternative methods of creating synchronization-preserving ambiguities are disclosed using off-center recording of copy protection data.

2 Claims, 3 Drawing Sheets

COPY PROTECTION FOR COMPUTER DISCS

RELATED CASES

This case is a continuation-in-part of my copending application Ser. No. 742,714 filed 07 June 1985 now abandoned and also entitled COPY PROTECTION FOR COMPUTER DISCS.

FIELD OF THE INVENTION

This invention relates to the protection of computer discs against unauthorized copying, and more particularly to methods and apparatus for deliberately creating on a disc a data ambiguity which disappears when the disc is copied without the proper equipment.

BACKGROUND OF THE INVENTION

The unauthorized copying of proprietary computer programs in the personal computer market is a widespread problem resulting in a considerable amount of lost sales for software houses. The bulk of these losses is due not to professional piracy, but rather to private individuals making a few copies of a program on their own computer for the use of their friends. Inasmuch as such private misuses are practically impossible to detect and control, it is desirable to so encode a program that it can detect whether it is an original or a copy, and to refuse to function if it finds itself to be a copy.

Various schemes have previously been proposed for this purpose. In general, these schemes can be divided into two groups: coding techniques and ambiguity techniques. The former are schemes which cause copied data to be different from the original data. These schemes require little or no special hardware to implement, but inquisitive users are likely to sooner or later discover the data discrepancy and correct it. An example of such a coding technique is described in U.S. Pat. No. 4,462,078 to Ross.

The ambiguity technique requires special hardware and is therefore more expensive to implement. On the other hand, it is immune to being defeated by the user. The ambiguity technique relies on the deliberate creation of ambiguous data which will produce inconsistent readouts during successive read operations. When a disc is copied, the data read during the copying pass will be unambiguously recorded on the copy, and successive read operations of the data on the copy will produce consistent readouts. It is an easy matter to so structure the program that it will perform a large number of successive read operations on the ostensibly ambiguous data and to stop program execution if all readouts of that data are the same.

It has previously been proposed to create this ambiguity by mechanical methods such as impairing the quality of the magnetic medium of the disc in selected areas, or by electronic methods such as recording data with varying amounts of write current. The former method is impractical to execute accurately in mass production; the latter is simple to execute but is also subject to being defeated at relatively small cost by determined users with a modicum of engineering ability.

Consequently, a need exists for a copy protection scheme of the ambiguity type which can be electronically implemented yet is difficult even for fairly sophisticated personal computer users to defeat.

SUMMARY OF THE INVENTION

The present invention discloses several ways of filling the above-stated need. In the preferred embodiment, a repetitive series of copy protection words is established containing, at predetermined locations, a key sequence which can be 1101 or 1011. The central transition in this sequence is increasingly delayed (i.e. phase shifted) by small increments in each repetition of the words so as to cause the key sequence to gradually change from 1101 to 1011. This scheme is effective in producing a readily detectable ambiguity in the key sequence, yet preventing synchronization problems which the computer could misinterpret as data ambiguities in the copy.

In other aspects of the invention, the required ambiguity can also be achieved by writing portions of a track off center, or by recording a third track partially covering two adjacent tracks.

It is thus the object of the invention to provide a copy protection method of the ambiguity type for computer discs which can be economically electronically implemented but is not easily defeatable.

It is another object of the invention to provide a copy protection method which reliably provides ambiguity where desired but avoids synchronization problems which may create unintended ambiguity.

DESCRIPTION OF THE PREFERRED EMBODIMENT

Conventional disc drives are designed to write zeros and ones onto a computer disc at a closely controlled, uniform current level so that the written data may be consistently and accurately read. Because the data supplied to the write circuitry is digital in nature, conventional disc drives can only write full ones or full zeros, or not write anything at all.

If a disc is copied on a conventional disc drive, and the original contains bits which the drive is unable to read clearly, the copied disc will contain data which may be different from the original data, but which will read clearly and consistently each time the copied disc is read.

Thus, if a pattern of weak or otherwise ambiguous bits is written on an original disc, successive reads of that pattern will produce inconsistencies which can be readily detected by comparing successive reads with one another. By contrast, a copy of that original made on a conventional disc drive will have a pattern which reads the same each time. This consistency identifies the copied disc as an unauthorized copy, and conventional techniques embodied within the program can then be employed to disable or destroy the copied program when the bootleg disc is used.

Data is conventionally recorded on magnetic discs by means of transitions or changes in the magnetic flux in the disc surface. These transitions are sensed by the read head as it travels along the tracks of the disc. The presence of a transition during a read interval is interpreted by the disc drive as a "1", the absence of a transition as a "0".

Synchronization of the read intervals with the transitions is provided by the transitions themselves. An occasional isolated "glitch" in the phase or timing of a transition is ignored by the synchronization circuits, but a sequence of as little as three consecutive zeros can produce a synchronization error in some drives. For this reason, data is preferably encoded in such manner that no more than two successive zeros ever appear in the data train.

Figure 1:
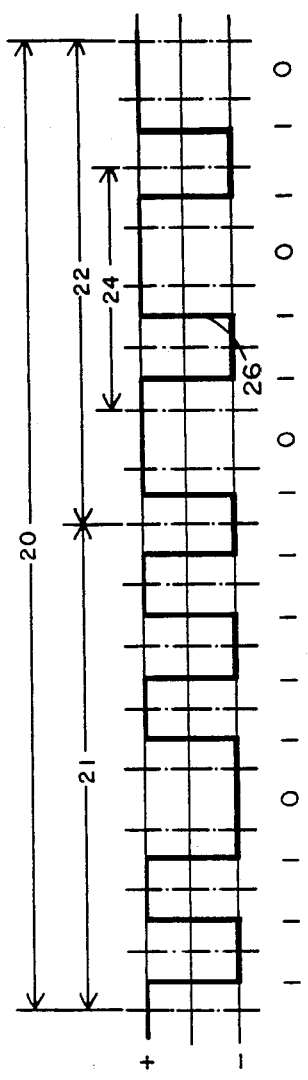
FIG. 1 is a time-amplitude diagram showing the magnetic flux changes during a copy protection word in the scheme of the invention.

FIG. 1 shows what happens when the scheme of this invention is used. A repetitive series of two-byte copy protection words 20 is recorded on the disc. Each word consists of a synch byte 21 such as 11101111 (hexadecimal EF) followed by a key byte 22 which is preferably 10110110 (hexadecimal B6). The large number of ones in the synch byte, and the ones in the key byte which remain in phase provide positive synchronization of the read data on each side of the transition 26, in which the ambiguity-creating phase variation of this invention occurs.

Figure 2:
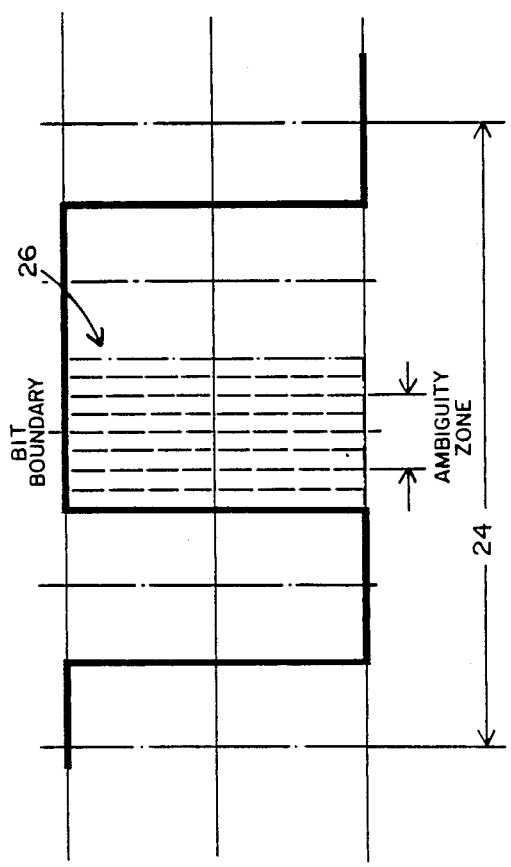
FIG. 2 is an enlarged diagram of the key sequence in the copy protection word of FIG. 1.

As will be seen in FIG. 2, the position of the transition 26 in the key sequence 24 of the key byte 22 is variable (dotted lines) between a clear 1101 (solid line) and a clear 1011 (dot-dash lines). In each successive repetition of the copy protection word 20, the transition 26 is moved to the right in FIG. 2 by a predetermined increment (e.g. 1/32 bit interval) so that the key sequence 24 gradually turns from a clear 1101 to a clear 1011. Somewhere in the central portion of the series of copy protection words 20, an ambiguity will therefore arise which will cause the read head of the disc drive to read inconsistent data on successive reads of the copy protection word series. This ambiguity may include occasional reads of 1001 if a transition right on the boundary between two read intervals is not detected at all.

It is important that the two-bit sequence containing the variable transition 26 always be flanked by a "1" on each side. If this is not done, the movement of the transition 26 across the bit boundary may, for the reason stated above, result in the occasional spurious reading of three or more consecutive zeros. In systems which risk loss of synchronization when more than two successive zeros are read, the resulting random loss of synchronization on a copied disc can cause reading anomalies which the program interprets as ambiguities identifying a legitimate disc.

Various conventional techniques may be used to obtain the incremental phase shift of the transition 26. For example, each detection of the synch byte 21 may be used to advance a counter which increasingly delays the transition 26 in the following key byte 22.

Figure 3:
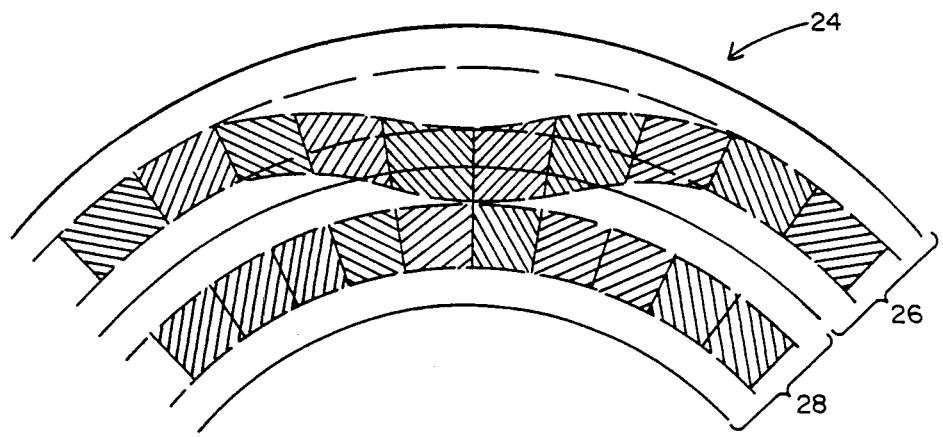
FIG. 3 is a schematic diagram illustrating another embodiment of this invention.
Figure 4:
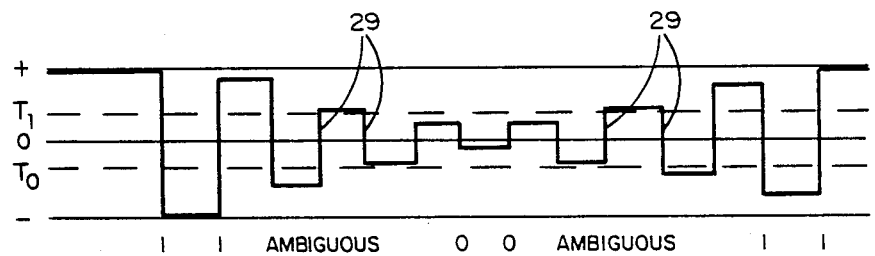
FIG. 4 is a time-amplitude diagram showing the magnetic flux changes produced by the embodiment of FIG. 3.

FIGS. 3 and 4 illustrate another method of obtaining ambiguity in an original recording. Most of the disc drives used in conjunction with personal computers are built for economy and do not have the sophisticated track follower circuits found in the more expensive business machines. Inasmuch as the copy protection contemplated by this invention is directed at preventing small-scale copying by individuals, it is practical to create ambiguity by gradually deflecting the recording head one or more times while recording a meaningless sequence of data.

In this manner, as shown in FIG. 3, a pattern of zeros (downward-slanting cross-hatching) and ones (upward-slanting cross-hatching) may be written on the disc 24 in positions increasingly/or decreasingly radially offset from the center of track 26 by an appropriate amount ranging, as shown in FIG. 3, up to about halfway between track 26 and track 28. When track 26 is read, the bits of the pattern may or may not be detected, depending on the amount of offset. In the embodiment of FIG. 3, the ambiguity-producing circuit may simply consist of a circuit which varies the recording head positioning under the control of the program. Ambiguity also exists, due to bleedover, when track 28 or any track between tracks 26 and 28 is read.

FIG. 4 illustrates the flux pattern detected by the read head of a conventional personal computer disc drive when reading a sequence of ones recorded in accordance with FIG. 3. Transitions such as 29 which are near the thresholds $T_1$ and $T_0$ are ambiguous and will be read differently on successive reads.

The method of FIGS. 3 and 4 can only be used with disc drives whose synchronization permits a substantial number of successive zeros, as any transitions well below the thresholds $T_1$ and $T_0$ will be read as zeros. This problem is overcome by the embodiment of FIG. 5.

Figure 5:
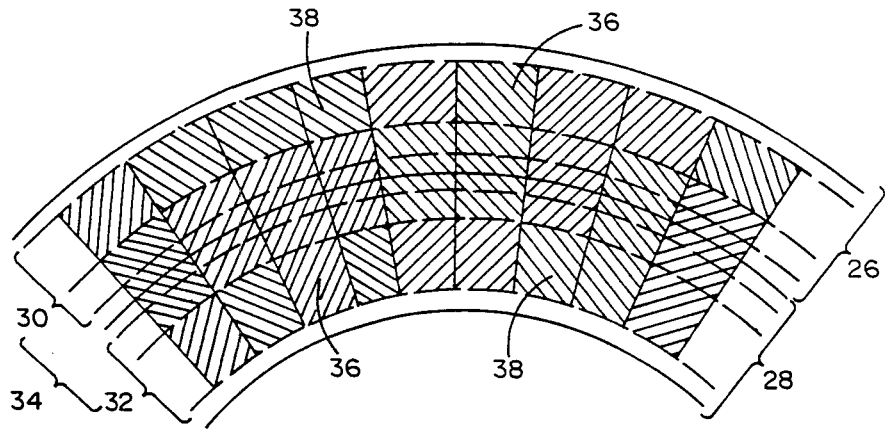
FIG. 5 is a schematic diagram illustrating yet another embodiment of the invention.

In FIG. 5, appropriate copy protection data 30, 32 (i.e. data which does not contain program information) is written in the normal manner on tracks 26 and 28, respectively. In addition, however, copy protection data 34 is written after tracks 26 and 28 are written, in a position to overlap tracks 26 and/or 28. Wherever a bit of the data 34 is the same as the corresponding bit 36 of data 30 or 32, the data 30 or 32 is undisturbed, and it can be read clearly. However, wherever a bit of the data 34 is of the opposite value from the corresponding bit 38 of the data 30 or 32, an ambiguity is created with regard to the value of the corresponding bit in track 26 or 28. As in the version of FIG. 3, the amount of ambiguity can be varied by varying the lateral displacement of the data 34 from the alignment of tracks 26 and 28.

The embodiment of FIG. 5 produces ambiguity due to bleedover, i.e. partial erasure of the real track. Of course, tracks 26 and 28 must not contain meaningful data at that location because such data would be destroyed by the partial erasure. However, the problem of synchronization loss is avoided because the data on the copy protection track 34 can be so structured that at least every third bit on tracks 26 and 28 is an unambiguous "1".

It will be seen that the invention can be carried out in many different ways, the gist of the invention being the deliberate creation and detection of ambiguities during the read operation without introducing synchronization ambiguities, and the enabling of the program only in response thereto.

Figure 6:
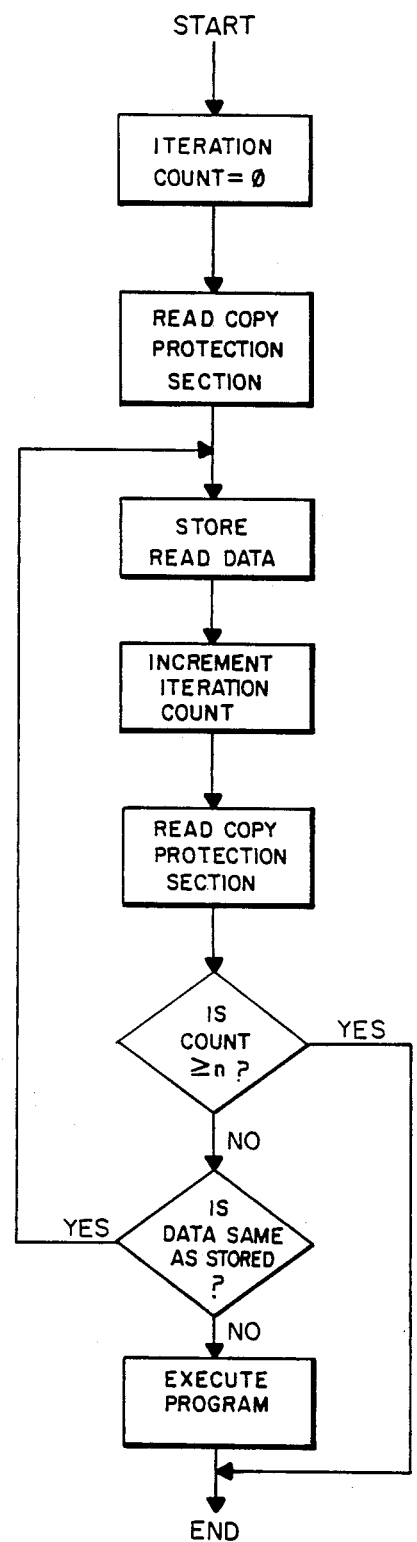
FIG. 6 is a flow chart illustrating the copy recognition routine of the computer program.

FIG. 6 illustrates the procedure by which the program recognizes and disables a copy. The copy protection section of the disc (i.e. the section of the disc in which the ambiguity appears) is read as much as n times (e.g. 16 times) in succession. Each read is compared to the preceding read. If the comparison shows a difference in any iteration, the disc is assumed to be an original, and the program is executed. If after n iterations, the comparison still shows identical data the disc is assumed to be a copy, and the program jumps to its end.

I claim:

1. A method of protecting a computer disc against copying, said disc containing information enabling the running of a computer program, and a data set providing an indication of copy legitimacy by causing inconsistent readouts when read repeatedly, said method comprising the steps of:
   (a) recording on said disc a set of data of which different portions are recorded at different phase angles;
   (b) causing said data set to be read repeatedly;
   (c) causing successive readouts of said data to be compared to one another;
   (d) structuring said program so that it cannot be run if said successive read-outs are consistent with one another;
   (e) said data set being a repetitive series of words, and said different portions being predetermined transitions within words;
   (f) said words of said data set including a bit sequence of two bits containing a single transition signifying a logic "1", and the phase angle of said transition being incrementally shifted in each repetition of said words within said series so as to gradually vary said bit sequence between "10" and "01";
   (g) said bit sequence being flanked by a logic "1" on each side thereof to avoid loss of synchronization in the event that said bit sequence is spuriously read as "00".

2. A method of protecting a computer disc against copying, said disc including a data set providing an indication of copy legitimacy by causing inconsistent readouts when read repeatedly, said method comprising the steps of:
   (a) recording a set of data on said disc in a manner which causes it to be ambiguous upon readout;
   (b) causing said data set to be repeatedly read;
   (c) causing successive readouts of said data set to be compared to one another;
   (d) preventing information on said disc from being used if said successive readouts are essentially consistent with one another; and
   (e) said data set and said ambiguity being so structured that no readout of said ambiguous data can produce more than two successive zeros.

* * * * *